(12) United States Patent
Oestreich et al.

(10) Patent No.: US 7,402,965 B2
(45) Date of Patent: Jul. 22, 2008

(54) DC COMMON BUS SELF-PROTECTION METHOD AND SYSTEM

(75) Inventors: Todd M. Oestreich, Cedarburg, WI (US); Timothy A. Davis, Whitefish Bay, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 11/524,818

(22) Filed: Sep. 21, 2006

(65) Prior Publication Data

US 2008/0074812 A1 Mar. 27, 2008

(51) Int. Cl.
*H02H 7/09* (2006.01)
(52) U.S. Cl. .............................. 318/33; 318/49; 318/68; 318/111
(58) Field of Classification Search ................ 361/33
See application file for complete search history.

(56) References Cited

U.S. PATENT DOCUMENTS

| | | | | |
|---|---|---|---|---|
| 6,142,760 A | * | 11/2000 | Niizeki et al. | ............... 425/145 |
| 6,326,747 B1 | * | 12/2001 | Shiba et al. | ................... 318/85 |
| 6,725,132 B2 | * | 4/2004 | Frankel et al. | .............. 700/300 |
| 7,135,826 B2 | * | 11/2006 | Ma et al. | ...................... 318/49 |

* cited by examiner

*Primary Examiner*—Lincoln Donovan
*Assistant Examiner*—Michael Brandt
(74) *Attorney, Agent, or Firm*—Fletcher Yoder PC; Alexander R. Kuszewski

(57) ABSTRACT

A system and method in accordance with the present technique for protecting motor drives from damage due to misconfiguration while coupled to a common DC bus, comprises sensing electrical operating parameters of the motor drives, automatically determining whether each of the drives is actually installed as a common bus leader or a common bus follower, and comparing the actual installation of the motor drives to a respective stored configuration of each of the motor drives as either a common bus leader or a common bus follower.

20 Claims, 4 Drawing Sheets

DC COMMON BUS SELF-PROTECTION METHOD AND SYSTEM

BACKGROUND

The invention relates generally to motor drives. Particularly, this invention relates to a protection system implemented in a common bus connection between motor drives.

In many modern automation settings, motors are generally coupled to motor drives configured to control the rotational speeds of the motors. In so doing, motor drives typically comprise components, such as converters, inverters and associated circuitry for controlling motors. Among electrical connections comprising the circuitry in motor drives is the electrical connection between the converter and the inverter of the motor drive, typically referred to as a "DC bus."

In certain instances it may be desirable to connect two or more motor drives via their respective DC buses. Such arrangements may be advantageous for many reasons, such as to minimize wiring and termination costs upon installation and servicing. Similarly, during operation, some motors may require input power while others may be available to regenerate power, the latter being applied to the common bus to aid in driving the then power-consuming motors. In such a configuration, the motor drives are said to share a common DC bus or to be in a common DC bus mode. A common DC bus mode may be established by connecting the DC bus of two or more motor drives, which could have identical hardware. In establishing a common DC bus connection between motor drives, it may be necessary to define functional modes of operation depending on how the motor drives are positioned in a circuit topology. That is, the configuration of each of the motor drives placed in a common DC connection may depend upon or may dictate how each motor drive in the circuit topology provides to or receives power from the common DC bus.

Given a certain circuit topology, user configurations of the motor drives not in accordance with the circuit topology may damage the motor drives, leading to their malfunction. There is a need, therefore, for a technique that can avoid mis-configuration of motor drives when connected to a common DC bus.

BRIEF DESCRIPTION

A system and method are provided for auto-detection of a common DC bus connection between motor drives. The auto-detection system and logic may implement a state machine or an algorithm adapted to ensure configurations of motor drives placed in a common DC bus mode comply with the manner the motor drives are installed in a given circuit topology.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
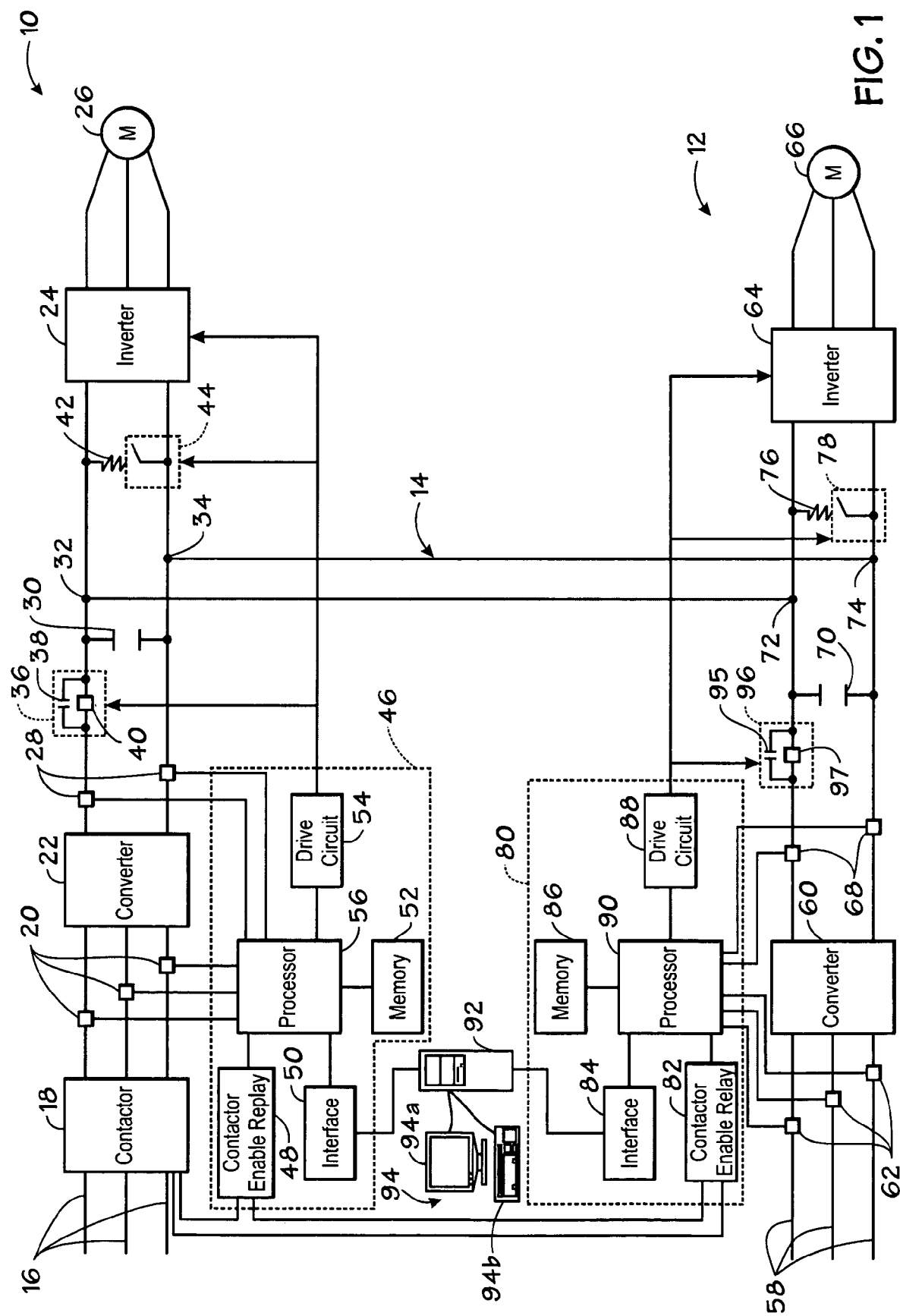
FIG. 1 illustrates a circuit diagram of motor drives coupled via a common DC bus, in accordance with an exemplary embodiment of the present technique.

Referring now to the figures, particularly, FIG. 1 is a circuit diagram of two motor drives 10 and 12 coupled via a common DC bus connection 14. The motor drive 10 is referred herein to as a common DC bus leader (CBL), while the motor drive 12 may be referred herein to as common a DC bus follower CBF. As will be discussed further below, the common bus connection 14 connects the CBL 10 and the CBF 12 such that a supply of DC power is provided from the CBL 10 to the CBF 12.

CBL 10 is provided with a three-phase alternating current AC input supply 16, typically from the power grid, via a three-phase contactor 18. The contactor 18 routes the AC supply, via sensors 20, to converter 22 which converts the AC input into a DC bus. The sensors 20 are adapted to detect incoming phases of the AC input supplied to the converter 22. That is, the sensors 20 detect whether a three-phase input is supplied to the converter 22 (i.e., present at the converter input terminals).

The converter 22 provides DC input power to an inverter 24 which provides output power to motor 26. As will be appreciated by those skilled in the art, the inverter is typically controlled by a control circuit that triggers solid state switches in the inverter to generate an AC output waveform of desired frequency for driving the motor. The converter 22 and the inverter 24 are connected by a DC bus. The DC bus includes sensors 28 for detecting DC bus voltage and a capacitor 30 for smoothing the DC power provided by the converter 22. Contact points 32 and 34 disposed on the DC bus connect the CBL 10 to the common DC bus 14. The DC bus further includes precharge circuitry 36, in the form of a precharge bypass relay 38 and precharge resistor 40 in the illustrated embodiment used to limit inrush current to the DC bus. The DC bus also includes a resistor 42 coupled to a solid state switch 44 used to regulate the DC bus in accordance with voltages detected across the DC bus.

The motor drive 10 contains a control unit 46 configured to control and monitor the operation of the CBL 10. The control unit 46 comprises a contactor enable relay 48, coupled to the contactor 18 and to a control unit 80 of the CBF 12. The control unit 46 further comprises an interface 50, a memory 52 and a drive circuit 54, all of which are connected to a processor 56. The processor 56 is also connected to sensors 20 and 28. The drive circuit 54 is connected to the solid state switch 44 of the CBL 10 for controlling the voltage regulation of the DC bus, precharge bypass relay 38 of the CBL 10 for controlling the precharge of the DC bus and inverter 24 of the CBL 10 for controlling the generated AC output waveform.

The CBF 12 comprises components similar to those described above with reference to the motor drive CBL 10. Thus, the CBF 12 includes a three-phase AC supply 58, leading to converter 60, via three-phase detecting sensor 62. Although the CBF 12 may have appropriate hardware configured to receive an AC input supply, such hardware may not be utilized while the motor drive 12 is configured as a CBF in a common DC bus mode.

The converter 60 of the CBF 12 provides DC input power to inverter 64 which provides power to motor 66. Similar to the CBL 10, the converter 60 and the inverter 64 are connected via a DC bus. The DC bus of the CBF 12 includes sensors 68 for detecting DC bus voltage, and a capacitor 70 for smoothing the DC power provided by the converter 60 or by the common DC bus connection 14. Contact points 72 and 74 disposed on the DC bus of the CBF 12 connect the motor drive 12 to the common DC bus 14. The motor drive 12 may also include precharge circuitry 95, similar to that shown with reference to the motor drive 10, however, such precharge circuitry may not be active for a motor drive configured as a common bus follower, such as the CBF 12. The DC bus of the CBF 12 further includes a resistor 76 coupled to a switch 78 used to regulate the DC bus of the motor drive, in accordance with voltages detected across the DC bus of the CBF 12, however, such circuitry may not be active for a motor drive configured as a common bus follower, such as the CBF 12.

Similar to the CBL 10 motor drive, the CBF 12 motor drive, too, contains a control unit 80 configured to control and monitor the operation of the CBF 12. The control unit 80 comprises a contactor enable relay 82, coupled to the contactor 18 and to the contactor enable relay 48 of the control unit 46 of the CBL 10. The control unit 80 further comprises an interface 84, a memory 86 and a drive circuit 88, all of which are connected to a processor 90. The processor 90 is further connected to sensors 62 and 68. The drive circuit 88 is connected to the solid state switch 78 of the CBF 12 for controlling the voltage regulation of the DC bus, precharge bypass relay 96 of the CBF 12 for controlling the precharge of the DC bus, and inverter 64 of the CBF 12 for controlling the generated AC output waveform.

The control units 46 and 80 are coupled via interfaces 50 and 84, respectively, to an external monitoring and configuring unit comprising a processor 92 connected to a user interface 94, which will typically include a keyboard 94a and a display 94b. The external monitoring and configuring unit comprising elements 92, 94a and 94b may, for example, enable a user to configure the motor drives 10 and 12 as common bus leaders or followers in accordance with a certain circuit topology. Accordingly, the external unit may notify a user of system faults arising from any user misconfiguration of the motor drives and, thereby, protecting the system from being damaged in such events.

As further illustrated in FIG. 1, the common bus DC connection 14 may establish a common bus mode such that the motor drive 10 is a common bus leader while the motor drive 12 is a common bus follower. In a common DC bus mode, the "common bus leader" has the ability to supply DC power to multiple common bus followers, while the "common bus follower" does not convert incoming AC power to DC power, but draws DC power from the common bus 14. Further, while in a common bus mode the CBF 12 may be provided with functionalities from CBL 10, such as DC bus precharge, DC bus regulation, phase loss detection, ground fault detection and discharging of the DC bus.

In a common DC bus mode, the sensors 20, 28, 62 and 68 may indicate whether the motor drives 10 and 12 are correctly configured as a CBL and a CBF, respectively. For example, when the motor drive 12 is configured as a CBF the sensors 68 may sample DC bus voltage to determine whether its magnitude across the DC bus of the motor drive 12 is in accordance with a common DC bus mode. Similarly, the sensor 62 may sample the power at the three-phase input 58 for loss of any phase signals, again, in accordance with configurations and installments enabling the motor drive 12 as a CBF. For example, the auto-detection logic and system may detect that the CBF 12 is in a "common bus mode" when its DC bus voltage is greater than a "bus under-voltage" level while three-phase power is not present, as described below with reference to FIGS. 3A and 3B. Similarly, the motor drives 10 and 12 may include a detection feature allowing incoming three-phase AC power only to be applied to a motor drive configured as a CBL, while allowing DC power without three-phase power present to be applied to a CBF.

In an exemplary common DC bus mode of operation implemented in a given circuit topology, where motor drive 10 is configured as a CBL and motor drive 12 is configured as a CBF, three-phase AC power is provided to the AC inputs 16 of the CBL 10 but not to the CBF 12. However, if the motor drive 10 is inadvertently configured to be a CBF and then supplied with a three-phase AC power, the sensors 20 would indicate to the processor 56 the presence of the three-phase supply. In turn, the processor 56 would open the contactor enable relay 48 so as to open the AC contactor 18 and remove AC power 16 from the drive. At the same time, the processor 56 may send a signal, via interface 50, to the monitoring unit 92 to issue a common DC bus drive fault.

For a motor drive configured as a CBF, such as the motor drive 12, DC bus voltage with no phase present is a valid operating condition for the common bus CBF 12. That is, lack of phase detection by the sensors 62 maintains the CBF 12 functional.

As previously mentioned, CBL 10 includes precharge circuitry 36 for powering its DC bus as well as for powering the DC bus of the CBF 12. In some embodiments, the CBF 12 may also include the precharge circuitry 95. For a CBF, such precharge circuitry may be used in cases where three-phase power is inadvertently applied to the CBF 12 so as to limit inrush current until a common bus fault is issued.

In the CBF 12, the solid state switch 78 remains open during the regulation and discharge of its DC bus by CBL 10. Accordingly, the CBF 12 will either share its regenerative energy with the common bus CBL 10 and possibly other CBF's, which may be motoring while the CBF 12 is regenerating. In some embodiments, if the regenerative energy is too large to be regulated by the resistor 42 of the CBL 10, a regenerative converter may be used.

After three-phase power is applied to the CBL 10 and precharge is successfully achieved, the CBL 10 is said to be in a "bus ready" state. For the CBF 12 such a state is reached only after a predetermined amount of time elapses, such as 2.5 seconds, allowing its DC bus voltage to be greater than the "bus under voltage" level. Such a time delay prevents the common bus CBF 12 from drawing DC bus current until the CBL 10 completes it precharge cycle.

Figure 2:
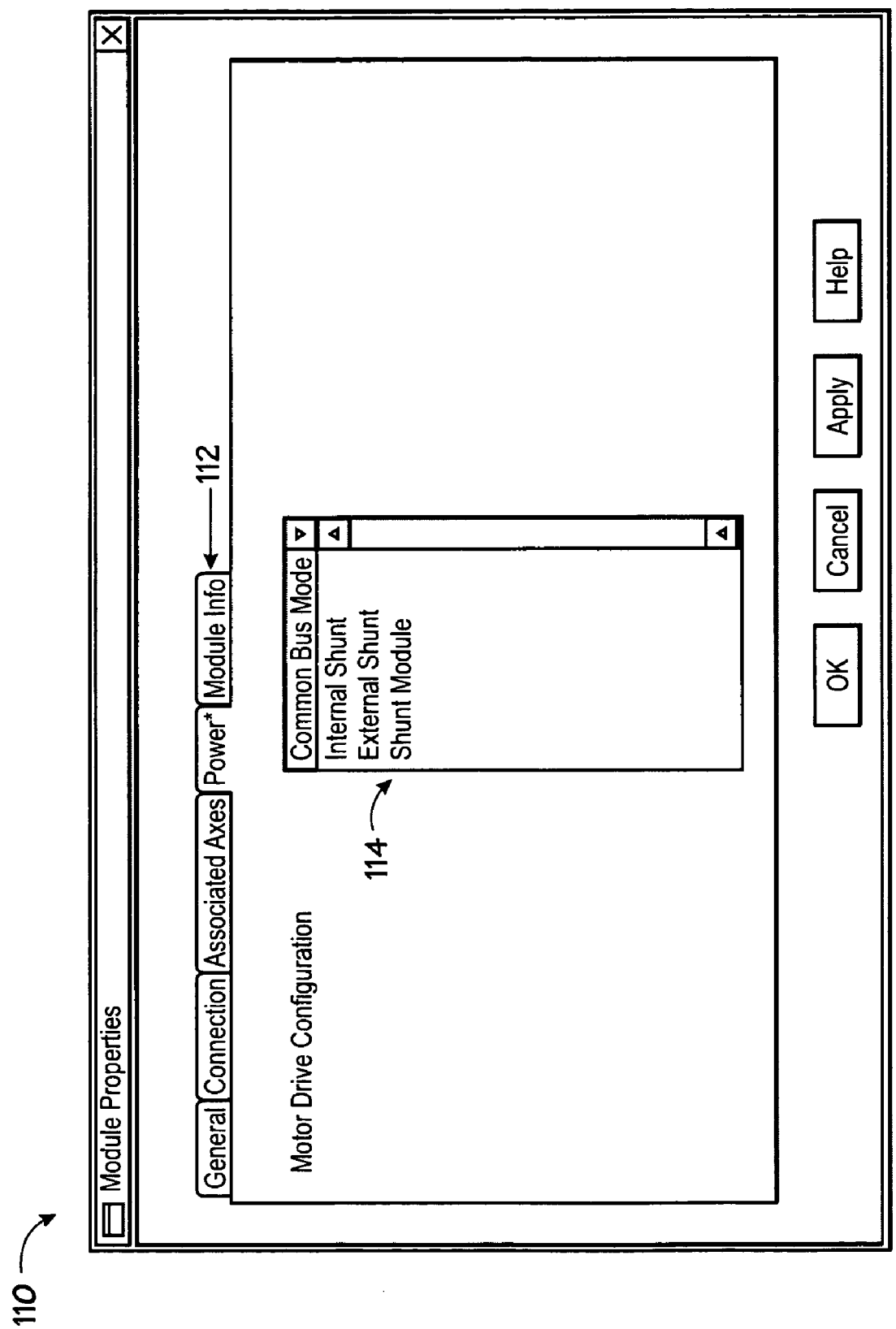
FIG. 2 illustrates a user configurable computer screen, in accordance with an exemplary embodiment of the present technique for managing configuration of motor drives sharing a common DC bus.

FIG. 2 is an exemplary user configurable screen 110 for configuring a motor drive in accordance with an exemplary embodiment of the present technique. The screen 110 may be displayed on the user interface 94a so that a user may conveniently control and monitor the motor drives 10 and 12.

The screen 110 may be used by a user to configure, for example, the motor drives 10 and 12 as common bus leader or follower, respectively, in a common DC bus mode. Accordingly, the screen 110 may include selection tabs 112 from which a user can select and alter settings, such as connections of the drives, their associated axes and power. In an exemplary embodiment, choosing from tab selection 112 the choice labeled "power" may display a list of choices 114 from which the user can select options for configuring the motor drives 10 and 12 as a CBL and a CBF, respectively.

Figure 3A:
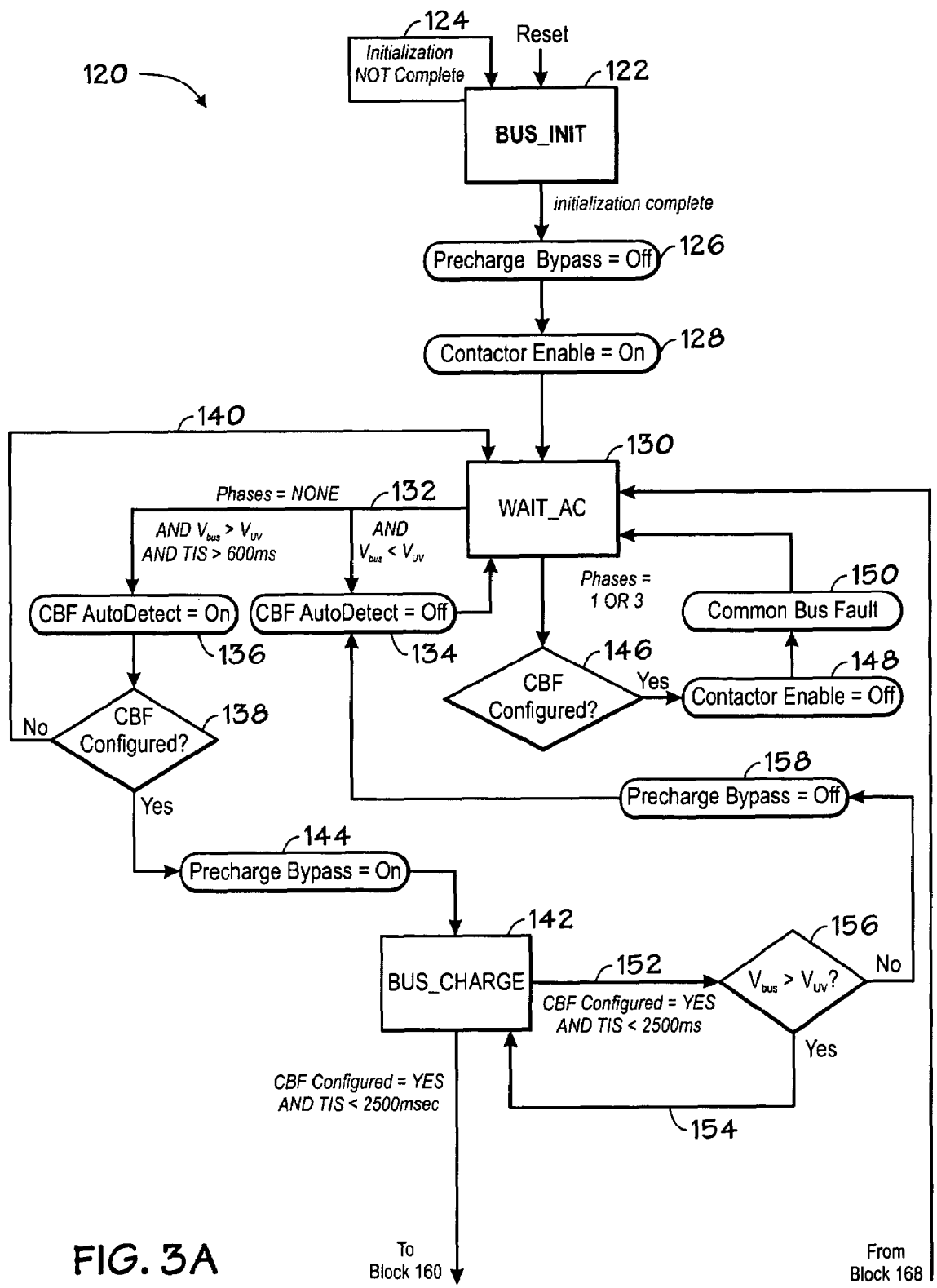
FIGS. 3A and 3B illustrate a block diagram of an exemplary state machine in accordance with an exemplary embodiment of the present technique for automatically detecting and preventing mis-configuration of motor drives on a common DC bus.
Figure 3B:
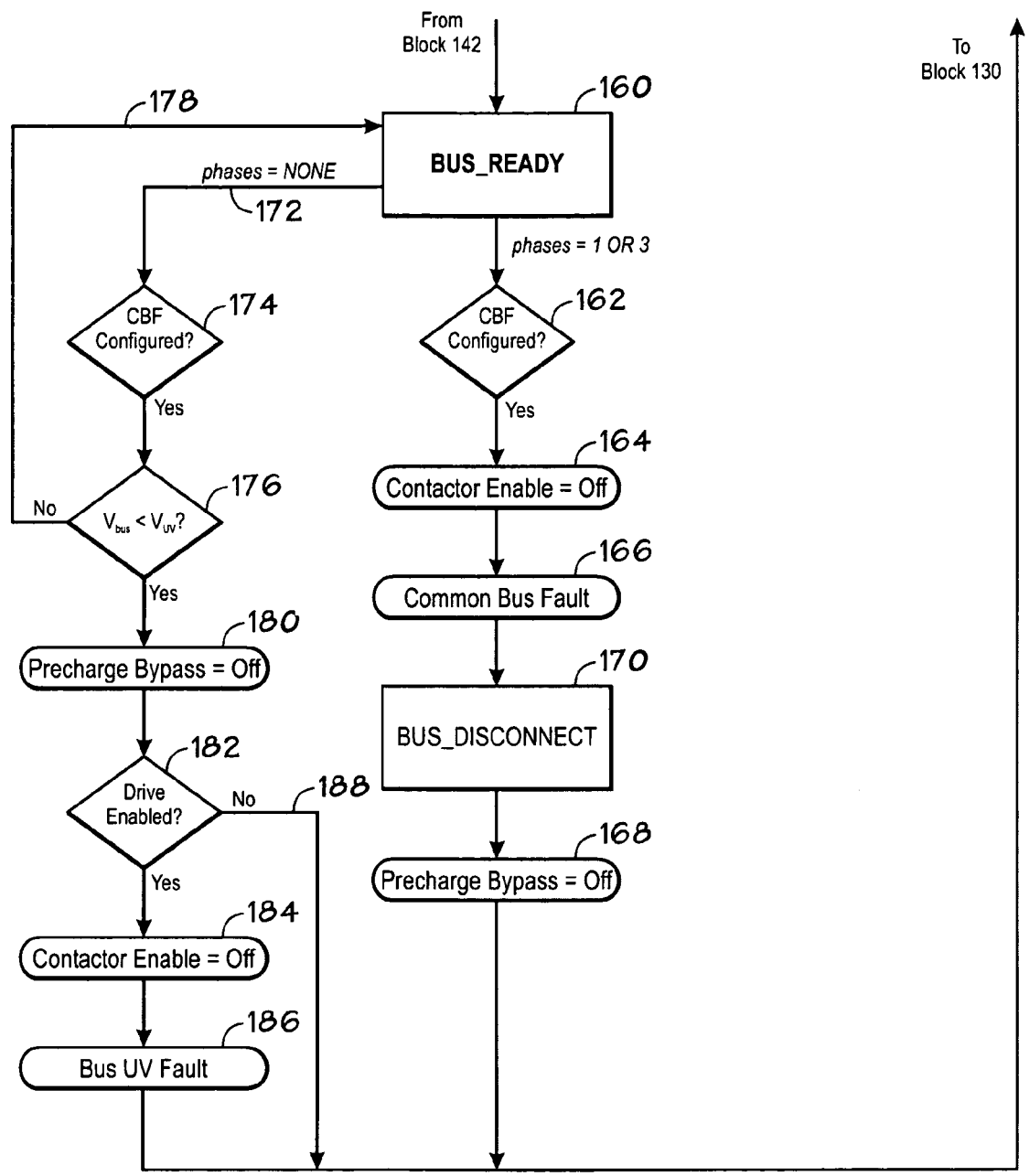

FIGS. 3A and 3B illustrate exemplary control logic 120 or a state machine, in accordance with an exemplary embodiment of the present technique. The logic 120 includes an auto-detection scheme implemented by a control unit or units, such as control units 46 and/or 80 (FIG. 1), having a series of steps and conditions that should be met to ensure that the configurations and installments of the motor drives 10 and 12 are properly matched when both drives are placed in a common DC bus mode. The logic 120 begins at block 122 labeled "BUS INIT" during which control power is applied to a motor drive such as the CBL 10 and/or CBF 12 (FIG. 1) and the control units 46 and/or 80 are initialized, as indicated by loop 124. Thereafter, the logic 120 proceeds to block 126 ensuring precharge circuitry is not bypassed. Thereafter the logic 120 proceeds to block 128 where an AC contactor, such as the AC contactor 18 FIG. 1, is enabled (i.e., closed) so that three-phase power may be connected to the motor drive 10 as shown in FIG. 1. The logic 120 then proceeds to block 130, labeled "WAIT AC", from which the logic 120 branches-off according to certain conditions implemented as part of the auto detection scheme, as indicated by text incorporated into lines extending from blocks in FIG. 3.

Extending to the left of block 130 is line 132 labeled "phases=NONE." That is, for a motor drive configured as a CBF no phases (i.e., incoming AC power) are expected to be detected by the sensors 62 of motor drive 12 when such a motor drive is configured as a CBF. At this stage of the auto detection scheme, the DC bus of the CBF 12 may be charging so that its voltage may rise to a desired voltage, referred to here as an "Under-Voltage" ($V_{UV}$). If the voltage of the DC bus, i.e., $V_{bus}$, is below $V_{UV}$, then block 134, labeled "CBF AutoDetect=Off", follows. This would indicate that the motor drive, whose DC bus is designated for charging, is not yet charged. In such a case, the logic 120 proceeds from block 134 to block 130 and continues to loop until a condition changes.

Alternatively, if $V_{bus}>V_{UV}$ in an amount of time greater than, for example 600 milliseconds (as labeled "time in state" (TIS) on logic 120), this is considered to indicate that the DC bus voltage is rising. Consequently, the logic 120 proceeds to block 136 labeled "CBF AutoDetect=On", wherein the motor drive sets an internal common bus follower flag indicating that the motor drive may be installed as a CBF. The logic then proceeds from block 136 to decision junction 138. If the motor drive is installed as a CBF but not configured as a CBF, the logic returns to block 130 via line 140. In so doing, the logic 120 prevents the motor drive from being enabled without configuration as a CBF. This also prevents the drive from being enabled when the DC bus is energized by a regenerative load. However, in a case where the motor drive is installed and configured as a CBF, the logic proceeds from block 138 to block 142 via block 144 where the precharge bypass relay is turned on.

If the motor drive is configured as a CBL, input signal phases are expected to be detected by sensors 20 (FIG. 1) of the motor drive 10. Accordingly, the logic proceeds from block 130 to decision junction 146. If the motor drive 10 is mistakenly configured as a CBF, then the logic 120 proceeds to block 148 where the three-phase contactor 18 is disabled (i.e., opened). Thereafter, the logic 120 proceeds from block 148 to block 150 and a common bus fault is issued. In so doing, the logic 120 prevents AC power from being applied to a motor drive configured as a CBF.

For a CBF, the logic remains at block 142, as indicated by lines 152 and 154 leading to and from decision junction 156, until a time of 2500 ms is reached. The period of time of 2500 ms is chosen so that the precharge of the CBL 10 is completed before CBF 12 is enabled, thus, avoiding damaging the precharge circuit of the CBL 10. If condition $V_{bus}>V_{UV}$ in decision block 156 is not satisfied during the 2500 ms delay, this indicates that the motor drive 12 has lost DC bus power from CBL 10 and the logic proceeds to block 158 to turn off the precharge bypass relay and then to block 134 to turn off the CBF AutoDetect flag. The logic then returns to block 130 to wait for DC bus power to be re-applied.

For a motor drive configured as a CBF and for TIS>2500 ms, the logic 120 proceeds from block 142 to block 160, labeled "Bus_Ready." In the "Bus Ready" state 160 (FIG. 3B), the logic 120 branches off according to various conditions corresponding to various configurations and installments of the motor drives 10 and 12. Accordingly, if single-phase or 3-phase AC power is inadvertently applied to a motor drive configured as a CBF, such as the CBF 12, while in the "Bus Ready" state 160, the logic 120 proceeds from decision junction 162 to block 164 where the three-phase contactor 18 (FIG. 1) is disabled (i.e., opened) and then to block 166 where the drive reports a common bus fault. The logic then proceeds to block 168 via block 170 to turn off the precharge bypass relay and then returns to block 130 to wait for DC bus power to be re-applied. In so doing, the common bus configuration prevents input AC power from being applied to a motor drive configured as a CBF.

Referring again to block 160, if no incoming AC power is applied to a motor drive configured as a CBF, the logic 120 proceeds, via line 172, to decision junction 174 to determine whether the motor drive is configured as a CBF. If not, this would indicate that the drive is installed as a CBL. If the motor drive is configured as CBF, then the logic 120 proceeds from decision junction 174 to decision junction 176 to determine whether the condition $V_{bus}<V_{UV}$ is satisfied. If this is not true, the logic 120 returns to the "Bus Ready" state of block 160 via line 178 as required in a normal mode of operation. If the condition $V_{bus}<V_{UV}$ is satisfied, this may indicate the CBF lost DC bus power from the CBL 10. As a consequence, the logic 120 proceeds to block 180 where the precharge bypass relay is set to an "off" state. From block 180 the logic 120 proceeds to decision junction 182 to determine whether the motor drive 12 may be enabled. If so, block 184 follows and the contactor 18 (FIG. 1) is disabled (i.e., opened) and an undervoltage fault is reported in block 186 due to removal of DC bus power during enablement of an axis. Thereafter, the logic 120 returns to the "Wait AC" state of block 130. If in decision junction 182 the motor drive 12 is determined to be not enabled, then the logic proceeds back to block 130 via line 188 without posting any fault as this is normal operation of the system when DC bus power is removed from a CBF.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for protecting motor drives from damage due to misconfiguration while coupled to a common DC bus, comprising:
    sensing electrical operating parameters of the motor drives;
    automatically determining whether each of the drives is actually installed as a common bus leader or a common bus follower; and
    comparing the actual installation of the motor drives to a respective stored configuration of each of the motor drives as either a common bus leader or a common bus follower.

2. The method of claim 1, comprising generating a user notice if the actual installation of at least one of the motor drives as a common bus leader or follower differs from its stored configuration.

3. The method of claim 1, comprising disabling one or more of the motor drives if the actual installation of at least one of the motor drives as a common bus leader or follower differs from its stored configuration.

4. The method of claim 1, comprising preventing a change in the stored configuration for a motor drive based upon the determined actual installation of the motor drive.

5. The method of claim 1, wherein the actual installation of each motor drive as a common bus leader or a common bus follower is determined by determining whether AC input power is applied to the respective motor drive.

6. The method of claim 1, wherein the actual installation of each motor drive as a common bus leader or a common bus follower is determined by determining whether a DC bus voltage in the respective drive reaches a desired voltage.

7. A method for protecting motor drives from damage due to misconfiguration while coupled to a common DC bus, comprising:
 sensing electrical operating parameters of a motor drive installed as a common bus leader and a motor drive installed as a common bus follower;
 automatically determining whether each of the drives is actually installed as a common bus leader or a common bus follower; and
 comparing the actual installation of the motor drives to a respective stored configuration of each of the motor drives as either a common bus leader or a common bus follower; and
 disabling an operation of at least one of the motor drives if the drive installed as a common bus leader is configured as a common bus follower or if the drive installed as a common bus follower is configured as a common bus leader.

8. The method of claim 7, comprising generating a user notice if the actual installation of at least one of the motor drives as a common bus leader or follower differs from its stored configuration.

9. The method of claim 7, wherein the actual installation of each motor drive as a common bus leader or a common bus follower is determined by determining whether AC input power is applied to the respective motor drive.

10. The method of claim 7, wherein the actual installation of each motor drive as a common bus leader or a common bus follower is determined by determining whether a DC bus voltage in the respective drive reaches a desired voltage.

11. A method for protecting motor drives from damage due to misconfiguration while coupled to a common DC bus, comprising:
 sensing electrical operating parameters of the motor drives;
 automatically determining whether each of the drives is actually installed as a common bus leader or a common bus follower;
 comparing the actual installation of the motor drives to a respective stored configuration of each of the motor drives as either a common bus leader or a common bus follower; and
 preventing a change in the stored configuration for a motor drive based upon the determined actual installation of the motor drive.

12. The method of claim 11, wherein the actual installation of each motor drive as a common bus leader or a common bus follower is determined by determining whether AC input power is applied to the respective motor drive.

13. The method of claim 11, wherein the actual installation of each motor drive as a common bus leader or a common bus follower is determined by determining whether a DC bus voltage in the respective drive reaches a desired voltage.

14. A system for protecting motor drives from damage due to misconfiguration while coupled to a common DC bus, comprising:
 a first motor drive installed as a common bus leader;
 a second motor drive installed as a common bus follower;
 sensing circuitry coupled to the motor drives for sensing electrical parameters of the motor drives; and
 at least one controller configured to automatically determine whether one of the drives is actually installed as a common bus leader or a common bus follower and to compare the actual installation of the motor drives to a respective stored configuration.

15. The system of claim 14, wherein at least one controller is configured to disable an operation of at least one of the motor drives if the drive installed as a common bus leader is configured as a common bus follower or if the drive installed as a common bus follower is configured as a common bus leader.

16. The system of claim 14, wherein the controller is configured to generate a user notice if the actual installation of at least one of the motor drives as a common bus leader or follower differs from its stored configuration.

17. The system of claim 14, comprising a configuration work station, wherein the system is configured to prevent a change in the stored configuration for a motor drive via the configuration work station based upon the determined actual installation of the motor drive.

18. The system of claim 14, wherein the actual installation of each motor drive as a common bus leader or a common bus follower is determined by determining whether AC input power is applied to the respective motor drive.

19. The system of claim 14, wherein the actual installation of each motor drive as a common bus leader or a common bus follower is determined by determining whether a DC bus voltage in the respective drive reaches a desired voltage.

20. A machine readable medium storing code for execution by a programmed computer, the medium comprising code for:
 automatically determining whether each of a plurality of motor drives is actually installed as a common bus leader or a common bus follower;
 comparing the actual installation of the motor drives to a respective stored configuration of each of the motor drives as either a common bus leader or a common bus follower; and
 disabling an operation of at least one of the motor drives if the drive installed as a common bus leader is configured as a common bus follower or if the drive installed as a common bus follower is configured as a common bus leader.

* * * * *